United States Patent [19]

Brand et al.

[11] Patent Number: 4,744,967
[45] Date of Patent: May 17, 1988

[54] PROCESS FOR THE PURIFICATION OF EXHAUST GASES CONTAINING OXIDES OF NITROGEN AND SULFUR

[75] Inventors: Reinhold Brand, Moembris; Bernd Engler, Hanau; Peter Kleine-Moellhoff; Edgar Koberstein, both of Alzenau; Herbert Voelker, Hanau, all of Fed. Rep. of Germany

[73] Assignee: Degussa Aktiengesellschaft, Frankfurt, Fed. Rep. of Germany

[21] Appl. No.: 4,407

[22] Filed: Jan. 20, 1987

[30] Foreign Application Priority Data

Jan. 18, 1986 [DE] Fed. Rep. of Germany ....... 3601378

[51] Int. Cl.$^4$ .......................... B01J 8/00; C01B 21/00; C01B 17/00
[52] U.S. Cl. .................................... 423/239; 423/235; 423/244; 423/533; 423/541 A
[58] Field of Search ................... 423/235, 235 D, 239, 423/239 A, 541 A, 533, 244 R

[56] References Cited

U.S. PATENT DOCUMENTS 3,359,069  12/1967  Fukert et al. ................... 423/541 A
3,781,408  12/1973  Lin ........................................ 423/244
4,350,670   9/1982  Matsuda et al. ................ 423/239 X

FOREIGN PATENT DOCUMENTS 29-19812  11/1980  Fed. Rep. of Germany ...... 423/244
56-105733  8/1981  Japan .................................. 423/244

OTHER PUBLICATIONS $NO_x$–Bildung und $NO_x$–Minderung bei Dampferzeugern fur fossile Brennstoffe, 6/1986.

Primary Examiner—Gregory A. Heller
Attorney, Agent, or Firm—Beveridge, DeGrandi & Weilacher

[57] ABSTRACT

A process is described for the purification of exhaust gases containing oxides of nitrogen and sulfur obtained from combustion installations and industrial production processes by selective catalytic reduction of the nitric oxides with ammonia, subsequent catalytic oxidation of sulfur dioxide with oxygen and conversion into sulfuric acid of the sulfur trioxide obtained.

23 Claims, 2 Drawing Sheets

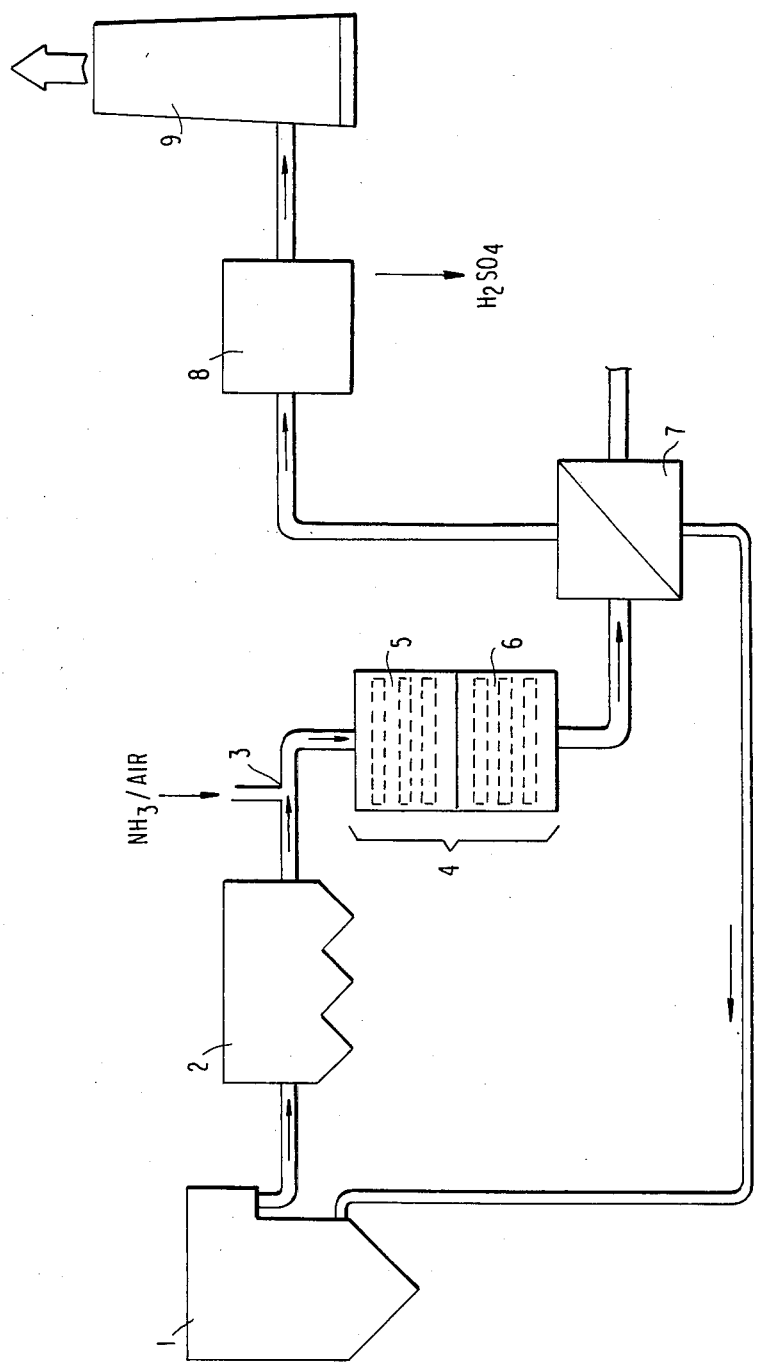
FIG. 1 – DESONOX PROCESS
DUST REMOVAL IN FRONT OF THE CATALYSTS

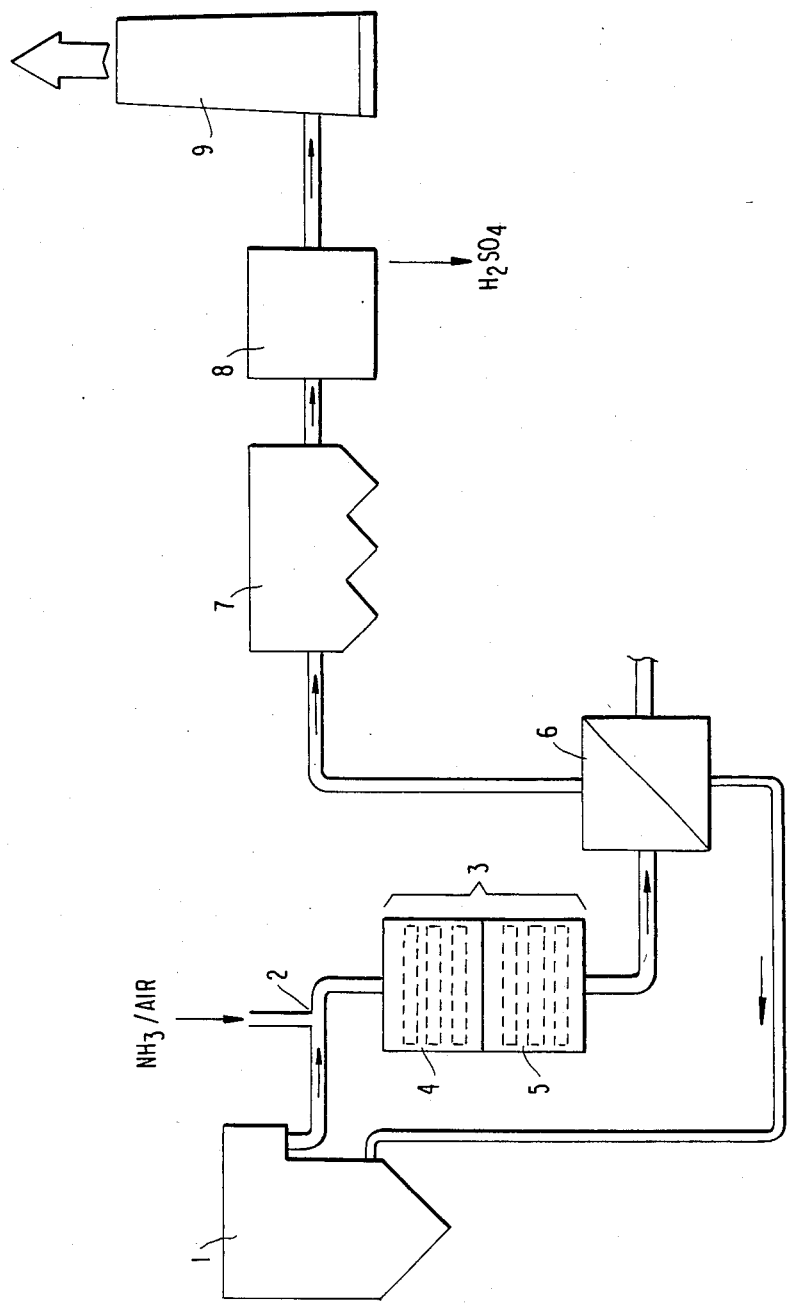
FIG. 2 — DESONOX PROCESS
DUST REMOVAL IN FRONT OF SULFURIC ACID WASHER

PROCESS FOR THE PURIFICATION OF EXHAUST GASES CONTAINING OXIDES OF NITROGEN AND SULFUR

The present invention relates to a simplified process and apparatus for the purification of exhaust gases containing oxides of nitrogen and sulfur from combustion installations.

Oxides of nitrogen as well as sulfur oxides which are formed as a result of combustion processes are counted among the main causes of the "acid rain" problem and the photosmog problem and of the resulting damage to the environment. These harmful substances should therefore be largely eliminated by removal from the exhaust gases from combustion prior to their discharge into the atmosphere.

Sources of the nitrogen oxide or sulfur oxide emissions are motor vehicle traffic, stationary combustion motors, power plants, heating power plants, steam generators for industrial purposes and for industrial production installations. In addition, carbon monoxide and hydrocarbons are also emitted by these sources.

As a result of the use of fuels having a low content of nitrogen and sulfur as well as by suitable additions to the fuel or by modification of the combustion systems, it is possible to achieve a lowering of the concentration of harmful substances in the exhaust gas; however, there are technical as well as economic limits to these primary procedures so that it has not been possible hitherto to achieve an exhaust gas sufficiently free of nitric oxide and/or sulfur oxide.

Exhaust gases from, for example, combustion operations using fossil fuels or from operations using an excess of the stoichiometric amount, i.e., combustion power plants operating on the lean side, contain excess oxygen in addition to oxides of nitrogen and sulfur.

The denitrification and desulfurization of these exhaust gases has been accomplished hitherto as a rule in separate processing steps which are installed at various points in the path of the exhaust flue gas. Known processes for the combined denitrification and desulfurization have been hitherto known to be very expensive and are imbued with many disadvantages. In the case of the large scale commercial development therefore, at the present time the preferred mode of operation is with separate denitrification and desulfurization operations.

The nitric oxide diminution in the case of combustion takes place as a rule through catalytic reduction. In order to ensure an optimal utilization of the needed reduction agent, primarily selective catalytic reduction processes are considered for the removal of nitric oxides because of the oxygen content in the exhaust gas. As a reduction agent, ammonia gas has proven itself to be suitable because it reacts easily with oxides of nitrogen in the presence of an appropriate suitable catalyst for the reaction, but only to a slight extent with the oxygen present in the gas.

In contrast to the denitrification process, noncatalytically wet processes have prevailed to the greatest extent for the desulfurization of exhaust gases. In the instance of the process used most frequently, the sulfur is separated in the form of gypsum. First of all the sulfur dioxide present in the exhaust is oxidized into sulfur trioxide with oxygen of the air, optionally after previous wet absorption. At the same time or subsequently, one treats this with a calcium hydroxide-, calcium carbonate- or calcium oxide suspension. The gypsum obtained thereby must then be deposited either on a waste dump or after reprocessing according to known methods, it may be used in the building material industry.

In the case of combustion power plants the following approaches are being used at the present time for the purification of exhaust gas;

1. Catalytic denitrification in the "hot" part of the exhaust flue gas in the high dust zone and desulfurization after the removal of dust from the exhaust flue gas by conversion of the sulfur dioxide into gypsum.

For this purpose an ammonia/air-mixture is distributed homogeneously in the flow of exhaust flue gas immediately downstream from the boiler. The reaction mixture hereupon passes in contact with a denitrification catalyst which is maintained at about 370°–400° C. In a subsequent heat exchanger, heat is removed from the flue gas which serves for example for the preheating of the combustion air for the boiler. The dust is then removed from the exhaust flue gas. The exhaust flue gas being largely free of dust but still containing sulfur dioxide is then reacted in the exhaust flue gas desulfurization apparatus with oxygen from the air and with a calcium compound for conversion into gypsum. The exhaust gas purified in such a way is discharged into the atmosphere through a chimney.

2. Desulfurization as set forth in "1" above followed by catalytic denitrification in the "cold" part of the flue gas in the low dust zone.

For this purpose, heat is removed from the flue gas in a heat exchanger after leaving the boiler and the flue dust is separated. There then follows the desulfurization of the flue gas. This is accomplished according to the same processing principle as set forth in "1" above. By means of an additional heat exchanger, the flue gas is preheated with the flue gas leaving the denitrification process and is then brought to the reaction temperature needed for the denitrification in a subsequent heating arrangement which burns, for example, natural gas in the stream of flue gas. The flue gas heated in such a way is now mixed with the reduction agent ammonia and then passes in contact with the denitrification catalyst. The nitric oxides are reduced selectively to nitrogen and steam. The denitrified flue gas is then carried back to the heat exchanger in which the flue gases coming from the desulfurization installation are preheated; they then pass through this heat exchanger and thereafter move into the chimney.

Both of these known flue gas purification measures discussed above, however, have a number of disadvantages which adversely affect the operation of the combustion installations.

The catalytic removal of nitrogen oxides according to "1" above has the advantage that in the case of a full load operation, a flue gas temperature of 350°–400° C. may be reached. These are temperatures at which denitrification catalysts can be utilized. In the case of a variable load operation which is very frequently the rule in the case of German power plants, the flue gas temperature drops as a rule below the minimum required for the operation of the catalyst in the partial load area, so that an expensive bypass connection system is necessary for the branching off of flue gas before the last step of heat removal in the boiler in order to maintain the reaction temperature.

Operations that are carried out in the zone of high dust leads, moreover, to catalyst abrasion by the flue dust and may cause deposits and thus plugging up of the catalyst channels or pores. The consequence of this is that for the sake of prevention a cleaning by blowing off, for example, with hot steam is required at relatively short time intervals.

In the case of each denitrification installation operated with ammonia moreover, the problem occurs, that this reduction agent is not completely converted and a small quantity of it, designated as "ammonia leakage", is present in the flue gas after it passes through the denitrification installation. This, in consequence of conversion between ammonia and the sulfur oxides present in the flue gas, leads to corrosive and sticky deposits of ammonium hydrogen sulfate and/or ammonium sulfate, for example, on the heat exchanging surfaces of the air preheater. The scrubbing of the air preheater which therefore becomes necessary periodically creates, in turn, a waste water problem. Furthermore, the dust from the dust removal apparatus as well as the gypsum from the flue gas desulfurization apparatus is contaminated with ammonia and renders further utilization or waste management more dificult. Ammonia escaping from the chimney leads to further adverse environmental impact.

According to approach "2" above, the flue gas in contact with the denitrification catalyst contains only small quantities of dust and sulfur dioxide which in itself is favorable for the functioning of the denitrification catalyst. This advantage however is offset by a series of disadvantages. Thus, for example, downstream from the desulfurization installation, a gas preheater and a support burner must be installed which is fired as a rule with high grade fuel for example natural gas, an expensive primary energy source. From that standpoint, additional investment and operating costs arise. The problem of the corrosive ammonium salt deposits and of the waste wash waters also exists in accordance with this procedure. However, the gypsum is no longer contaminated with ammonia.

Both known processing concepts have in common the step that the flue gas desulfuriation is carried out in a wet process, whereby gypsum is produced. As an operation substance, one uses for this purpose in most cases limestone which creates additional costs. The gypsum obtained by the method is of limited usefulness and can be sold only partially in the construction industry because of cost and because of an insufficient purity.

Accordingly, it is an object of the invention to provide a process for the purification of exhaust gases containing oxides of nitrogen and sulfur obtained from combustion installations and industrial processes, by the selective catalytic reduction of the oxides of nitrogen with ammonia, the subsequent oxidation of sulfur dioxide with oxygen and conversion of the sulfur trioxide obtained thereby into a compound containing sulfate ions which avoids the disadvantages of the known processes.

A feature of the present invention resides in the fact that the sulfur dioxide oxidation is carried out utilizing a catalyst for the reaction to produce sulfur trioxide, which is then converted after intermediate cooling into sulfuric acid using water. According to a very advantageous aspect of the process of the invention, the reduction and oxidation operations are carried out in one single reactor or reaction zone which has a first section equipped with the reduction catalyst for the reaction and a second section equipped with the oxidation catalyst for the reaction. Therefore, the denitrification and desulfurization take place as a result of the fact that the exhaust gases are brought into contact in a reactor immediately one after the other with two different reaction specific catalysts. The exhaust gas containing the harmful substances is mixed for this purpose with the gaseous reduction agent ammonia and is passed into contact with the first catalyst at an elevated temperature whereby the selective reduction of the nitrogen oxides takes place.

It is possible to use for this purpose base metal-containing as well as precious metal-containing catalysts. In this process, consideration must be taken of the fact that no substances are to be carried out of the first catalyst stage which might cause a contamination at the oxidation catalyst located downstream. Directly after the emergence from the reduction catalyst, the exhaust gas still containing sulfur dioxide, oxygen, as well as possibly carbon monoxide and/or hydrocarbons, is passed into contact with the oxidation catalyst whereby the sulfur dioxide is converted into sulfur trioxide in high yields. Any carbon monoxide and/or hydrocarbons present in the gas stream are converted simultaneously into carbon dioxide. After cooling of the flue gases, sulfur trioxide is contacted with aqueous sulfuric acid for example, in a gas scrubber unit and is separated as sulfuric acid with as high a concentration as possible. For this purpose, known installations and apparatus are suitable which are used, for example, in the case of sulfuric acid production.

The reduction step can be carried out using an exhaust gas which has little dust content or from which the dust has been largely removed; or a removal of the dust can be accomplished after the intermediate cooling prior to the hydration of sulfur trioxide. The first mentioned variation however is preferred because the mechanical and thermal load of the catalyst is considerably less. For the removal of the dust according to the first mentioned variation, the use of a high temperature electrofilter is particularly suitable.

A filter of the type mentioned above requires slightly higher investments in comparison to a cold operating electrofilter, but reheating measures and problems which are connected with the catalyst abrasion are avoided. Both embodiments in addition have the advantage that the removal dust is not contaminated with ammonia. Since the desulfurization according to the process of the invention does not produce any gypsum, no new problems of dumping and disposal arise which occur as a consequence of the contamination of the gypsum and an oversupply of gypsum in the market.

In the process according to the invention essentially all catalysts may be used which are suitable for the selective nitric oxide reduction. Examples of these are catalysts that are mixtures of the oxides of titanium, tungsten, vanadium and molybdenum (German patent No. 24 58 888) or catalysts formed of natural or synthetic aluminum silicates, for example, zeolites, or catalysts which contain precious metals of the platinum group. These reduction catalysts are well known in the art.

Also for the oxidation of sulfur dioxide, all suitable conventional oxidation catalyst systems may be used for this purpose. Examples for this are the systems mentioned in Gmelin, Handbook der Anorg. Chemie., (Manual of Inorganic Chemistry), Vol. 9, part A, page 320 et seq. (1975), for example, catalysts containing platinum or vanadium pentoxide or iron oxide. These oxidation catalyst systems are well known in the art.

The catalyst for the nitric oxide reduction and the catalyst for the sulfur dioxide oxidation can be in the form of a honeycomb monolith or in pellet or particulate form. The first mentioned form is preferred because of the lower back pressure and the more simple possibility for the cleaning off of dust.

Within the scope of the invention one or both catalysts can consist completely of catalytically active mass (solid catalyst) or in the case of one or both catalysts, the catalytically active substance can be deposited on an inert, ceramic or metallic body which optionally can be coated in addition with a surface area enlarging oxide layer (carrier catalyst). These forms of the catalyst are known in the art.

The two catalytic reactions carried out preferably in a single reactor may be operated in the temperature range of 250°–550° C., preferably 350°–450°, especially 380°–420° C.

The exhaust gas freed of nitric oxides and leaving the sulfur dioxide oxidation step according to the invention must be cooled intermediately, before the sulfur trioxide formed thereby can be converted with water into sulfuric acid. It has been determined to be favorable to cool this exhaust gas to a temperature of 20°–160°, preferably 70°–150°, especially 110°–140° C. prior to the hydration of the sulfur trioxide.

The hydration of the sulfur trioxide may be carried out in a one- or multistep scrubber with 70–86%, preferably 75–80% by weight of sulfuric acid. Such installation are known from the technology of the sulfuric acid production.

It is advantageous for the hydration of the sulfur trioxide to take place at temperatures of 40°–130°, preferably 95°–125°, especially 100°–115° C.

An advantage of the process according to the invention resides in the compact manner of construction of the waste gas purification installation which is accomplished by the joint arrangement of the nitrification and desulfurization catalysts in the preferred common reactor.

As a result of the downstream location of the oxidation catalyst, a further advantage of the invention resides in the fact that an ammonia leak can be completely avoided in the overall installation, since the small quantity of unused ammonia from the denitrification step is completely oxidized at the oxidation catalyst. The content of the nitric oxide in the purified flue gas will be only slightly raised again as a result. As a consequence of that, all technical problems associated with the ammonia leakage of the conventional flue gas purification installations are omitted, such as for example the corrosion caused by ammonium salt deposits and advance impact on the environment caused by scrubbing waters or discharge of ammonia into the atmosphere.

For the desulfurization, no chemicals are needed except water. The water may be used as such or in the form of concentrated sulfuric acid, whereby $H_2SO_4$ may be produced continuously and may be obtained in concentration of 75–80% by weight. The sulfuric acid obtained from the sulfur oxides entails practically no raw material costs and can easily be sold because of its great range of applications in the chemical industry.

The invention will be further described hereinafter and is illustrated by the accompanying drawings wherein:

FIG. 1 is a flow diagram of one embodiment of the invention, and

FIG. 2 is a flow diagram of another embodiment of the invention.

DETAILED DESCRIPTION OF THE INVENTION

Embodiment 1

Removal of dust upstream of the catalysts.

According to FIG. 1, the flue gases emerging from the boiler apparatus (1) are freed of dust in a hot operating electrofilter (2), then an ammonia/air-mixture is introduced into contact with the gases at (3) for admixture and are fed into the combination reactor (4). In the reactor in the direction of flow of the gas there is illustratively shown an array of three layers of monolithic, ceramic honeycomb catalysts (5) disposed one behind the other for the catalytic reduction of nitric oxide in the exhaust gas.

In the same reactor housing (4), there are located downstream three layers of monolithic, ceramic honeycomb catalysts (6) for the sulfur dioxide oxidation. There is a broad range for the permissible distances between the individual catalysts or the catalyst types located in the reactor (4). The dimensions of the spacing arrangement of the catalysts are determined to insure the production of a turbulent transverse movement in the flue gas and avoidance of local mixing or "channeling".

The catalytic reactor (4) is followed downstream by a heat exchanger (7) of conventional design such as for example, a pipe bundle heat exchanger. In the heat exchanger (7), the denitrified gas and the gas containing the sulfur compounds as sulfur trioxide is cooled down to the intended operating temperature of the $SO_3$ scrubber. The heat conducted away by the heat exchanger (7) serves for the preheating of the combustion air for the boiler combustion. The exhaust gas next passes to the gas scrubber (8), wherein the exhaust gas is converted with water as such or in the form of dilute aqueous sulfuric acid, whereby a higher concentration of $H_2SO_4$ is obtained. The scrubber is best operated with sulfuric acid in circulation, which has a concentration which is close to, or equal to the desired final concentration of 75–80% by weight. The completely purified exhaust gas leaving the scrubber may then be discharged into the atmosphere by way of the chimney (9).

Embodiment 2

Dust removal upstream of the sulfuric acid scrubber.

According to FIG. 2, the flue gases emerging from the boiler installation (1) are conveyed in a conduit and at any convenient point (2) are mixed with an ammonia/air-mixture and are fed into the reactor (3). In the reactor (3) in the direction of flow of the gas, there is illustratively arranged three layers of monolithic, ceramic honeycomb catalyst (4) one behind the other for the reduction of nitric oxide.

In the same reactor housing (3) this reduction catalyst arrangement is suceeded downstream, illustratively, by three additional layers of monolithic, ceramic honeycomb catalyst (5) for the sulfur dioxide oxidation reaction. For the spacing of the distances between the individual catalysts, a wide range is contemplated. The spacings have for their purpose the production of a turbulent, transverse movement in the flue gas and thereby avoid loal effects or "channeling".

The catalytic reactor (3) is followed downstream by a heat exchanger (6) such as for example, a pipe bundle heat exchanger. Other conventional heat exchangers can be used. In the heat exchanger, the gas from which nitrogen has been removed and containing the sulfur compounds as sulfur trioxide, is cooled to the selected operating temperature of the $SO_3$ scrubber (8). The heat which has been carried off thereby serves for the preheating of the combustion air for the firing of the boiler. The dust filter (7) follows downstream from the heat exchangers.

In the scrubber (8), the exhaust gas is converted with water as such or for example in the form of diluted aqueous sulfuric acid, whereby $H_2SO_4$ of a higher concentration will be obtained. The scrubber is best operated with sulfuric acid already in circulation which has a concentration close to, or equal to the desired final concentration of 75–80% by weight. The completely purified exhaust gas leaving the scrubber (8) may then be discharged into the atmosphere by way of the chimney (9).

EXAMPLE

The process according to the invention was operated in an apparatus constructed according to embodiment 1 shown in FIG. 1 which was installed into the path of the flue gas of a coal fired heating power plant with heat power coupling connection. Hard coal dust is used as fuel in the heating power plant formed of three water pipe boilers with natural circulation. The combustion load of the boiler amounts to 98 MW. As a result of the heat power coupling, always 18 MWel and 50 $MW_{th}$ are produced and delivered. The quantity of exhaust gas per boiler amounts to 110 000 $m^3$ (N)/h.

The flue gas for the apparatus was removed downstream from electrofilter which was operated at about 450° C.

The technical data of the pilot apparatus are summarized in Table 1.

TABLE 1

| Technical data of the pilot apparatus | |
|---|---|
| flue gas throughout | 500 $m^3$(N)/h |
| dust content in the flue gas following E-filter | 20–50 mg/$m^3$(N) |
| space velocity $NO_x$-catalyst | 7500 $h^{-1}$ |
| space velocity oxidation catalyst | 7500 $h^{-1}$ |
| empty pipe velocity in the reactor | 3 m/s |
| flue gas temperature | 420–460° C. |
| total loss of pressure at the catalyst | 2400 Pa |
| inlet temperature in the $SO_3$-scrubber | 130° C. |
| operating temperatures of the $SO_3$-scrubber | 100–110° C. |
| $SO_3$-removal in the $SO_3$-scrubber | >95% |
| $H_2SO_4$ final concentration | 77–80% by weight |

The $NO_x$-catalyst was made as a carrier catalyst consisting of mullite honeycomb bodies of the dimensions 150 mm×150 mm×150 mm length with a cell density of 16/$cm^2$ and a zeolite coating of the mordenite type. The zeolite coating of the mordenite type is known.

The oxidation catalyst was made as a carrier catalyst consisting of multiple honeycomb bodies of the dimensions 150 mm×150 mm×150 mm length with a cell density of 16/$cm^2$ and an α-aluminum oxide coating which contained 2.5 g./$dm^3$ of platinum in finely distributed form.

The distance between the identical catalysts was fixed at 160 mm and between the two different catalysts was fixed at 200 mm.

After 2000 operating hours, at a mole ratio of ammonia : nitric oxide of 0.9, conversion rates for nitric oxide of greater than 94% could be measured and for sulfur dioxide the conversion was greater than 91%. An ammonia leak could not be proved in any of the cases downstream from the combination reactor.

The data for the flue gas composition with the achieved conversion values are summarized in Table 2.

TABLE 2

| Exhaust Gas Component | Concentration Upstream of Combination Catalyst | Concentration Downstream of Combi-catalyst | Conversion Values | Method of Measuring |
|---|---|---|---|---|
| $NO_x$ | 380–510 vpm | 20–30 vpm | >94% | chemical luminescence method |
| $SO_2$ | 580–640 vpm | 50–57 vpm | >91% | UV spectroscope |
| $O_2$ | 7–8 vol. % | approx. 7 vol. % | — | paramagnetic method |
| $NH_3$ | 340–455 vpm | not provable | quantitatively | wet-chemical absorption and analysis |

Further variations and modifications will be apparent from the foregoing description and are intended to be encompassed by the claims appended hereto The German application No. P 36 01 378.1 is relied on and incorporated herein.

We claim:

1. A process for the purification of exhaust gas containing oxides of nitrogen and sulfur obtained from combustion installations and industrial production processes comprising
   selectively catalytically reducing the oxides of nitrogen with a sufficient amount of ammonia for the reduction of oxides of nitrogen in the exhaust gas in the presence of a reduction catalyst at a temperature in the range of 250°–550° C., and subsequently oxidizing sulfur dioxide with oxygen in the presence of a catalyst therefor at a temperature in the range of 250°–550° C. to obtain sulfur trioxide, cooling the sulfur trioxide to a temperature of from 20°–160° C., and converting the sulfur trioxide obtained into sulfuric acid, wherein the reduction and oxidation are carried out in a single reaction zone, the first section of which contains said reduction catalyst and the second section of which contains said oxidation catalyst.

2. The process according to claim 1, further comprising initially treating said exhaust gas to remove dust therefrom.

3. The process according to claim 1, further comprising treating the exhaust gas for removal of dust after an intermediate cooling.

4. The process according to claim 3, wherein the removal of dust treatment is carried out prior to conversion to sulfuric acid.

5. The process according to claim 1, wherein the reduction catalyst for the nitric oxide reduction is a honeycomb or in particulate form.

6. The process according to claim 1, wherein the oxidation catalyst is a honeycomb or in particulate form.

7. The process according to claim 1, wherein the reduction catalyst consists of a catalytically active mass.

8. The process according to claim 1, wherein the reduction catalyst comprises a catalytically active substance deposited on an inert, ceramic or metallic body.

9. The process according to claim 8, wherein said inert body is additionally coated with a surface area enlarging oxide layer.

10. The process according to claim 1, wherein the oxidation catalyst consists of catalytically active mass.

11. The process according to claim 1, wherein the oxidation catalyst comprises a catalytically active substance deposited on an inert, ceramic or metallic body.

12. The process according to claim 11, wherein said inert body is additionally coated with a surface area enlarging oxide layer.

13. The process according to claim 1, wherein the temperature range for reducing is 350°–450° C.

14. The process according to claim 13, wherein the temperature range is 380°–420° C.

15. The process according to claim 1, wherein the temperature range of oxidation is 350°–450° C.

16. The process according to claim 15, wherein the temperature range is 380°–420° C.

17. The process according to claim 1, wherein the temperature of cooling is 70°–150° C 18. The process according to claim 1, wherein the temperature of cooling is 110°–140° C.

19. The process according to claim 1, wherein the sulfur trioxide is treated by hydration carried out in a one- or multistep scrubber with 70–85%, by weight of sulfuric acid.

20. The process according to claim 19, wherein the process is carried out with 75–80% sulfuric acid.

21. The process according to claim 19, wherein the hydration of the sulfur trioxide is carried out at a temperature of 40°–130° C.

22. The process according to claim 21, wherein the temperature 95°–125° C.

23. The process according to claim 21, wherein the temperature is 100°–115° C.

* * * * *